United States Patent
Kassner

(10) Patent No.: US 7,165,538 B2
(45) Date of Patent: Jan. 23, 2007

(54) METHOD AND DEVICE FOR OPERATING AN INTERNAL COMBUSTION ENGINE HAVING AT LEAST TWO CYLINDER BANKS

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/212,004

(22) Filed: Aug. 24, 2005

(65) Prior Publication Data

US 2006/0045765 A1    Mar. 2, 2006

(30) Foreign Application Priority Data

Aug. 24, 2004    (DE) ...................... 10 2004 040 925

(51) Int. Cl.
*F02B 33/42* (2006.01)
*F02B 33/00* (2006.01)

(52) U.S. Cl. ...................... 123/564; 123/612
(58) Field of Classification Search ................ 123/564, 123/559.1; 60/597, 598, 600, 612
See application file for complete search history.

(56) References Cited

U.S. PATENT DOCUMENTS

| 4,428,199 | A | * | 1/1984 | Moore et al. ................ 60/600 |
| 5,261,236 | A | * | 11/1993 | Ironside et al. ............... 60/600 |
| 5,850,738 | A | * | 12/1998 | Hayashi ........................ 60/602 |
| 5,899,069 | A | * | 5/1999 | Watanabe ..................... 60/602 |
| 6,698,203 | B1 | * | 3/2004 | Wang ............................ 60/611 |
| 2003/0177765 | A1 | * | 9/2003 | Wang ............................ 60/602 |
| 2006/0032224 | A1 | * | 2/2006 | Akins et al. .................. 60/602 |

FOREIGN PATENT DOCUMENTS

| DE | 102 50 319 | 10/2003 |
| EP | 0 952 454 | 10/1999 |

* cited by examiner

*Primary Examiner*—Mahmoud Gimie
(74) *Attorney, Agent, or Firm*—Kenyon & Kenyon LLP

(57) ABSTRACT

A method and a device for operating an internal combustion engine having at least two cylinder banks are provided, each of the at least two cylinder banks having an air supply with an individual compressor, and a coordination of the compressors is possible in a simple and precise manner. In this context, a shared setpoint value is predefined for a characteristic variable for the rotational speed of a first compressor in a first air supply of a first cylinder bank, and a characteristic variable for the rotational speed of a second compressor in a second air supply of a second cylinder bank. An actual value of the characteristic variable for the rotational speed of the first compressor and an actual value for the characteristic variable for the rotational speed of the second compressor are corrected to the shared setpoint value.

6 Claims, 2 Drawing Sheets

METHOD AND DEVICE FOR OPERATING AN INTERNAL COMBUSTION ENGINE HAVING AT LEAST TWO CYLINDER BANKS

FIELD OF THE INVENTION

The present invention relates to a method and a device for operating an internal combustion engine having at least two cylinder banks.

BACKGROUND INFORMATION

Methods and devices for operating an internal combustion engine having a plurality of cylinder banks are already known, each cylinder bank having an air supply with an individual compressor. Each compressor is driven by a turbine in an exhaust branch of the associated cylinder bank. Thus, each cylinder bank of the internal combustion engine is equipped with an individual exhaust turbocharger which includes a compressor in the air supply to the individual cylinder bank and a turbine in the exhaust branch of the respective cylinder bank.

At present, there exists a problem related to control engineering, namely with the coordination of the exhaust turbochargers.

SUMMARY OF THE INVENTION

In contrast, the method according to the present invention and the device of the present invention for operating an internal combustion engine including at least two cylinder banks, offer the advantage that a shared setpoint value is predefined for a characteristic variable for the rotational speed of a first compressor in a first air supply of a first cylinder bank and for a characteristic variable for the rotational speed of a second compressor in a second air supply of a second cylinder bank, and that an actual value of the characteristic variable for the rotational speed of the first compressor and an actual value of the characteristic variable for the rotational speed of the second compressor are corrected to the shared setpoint value. This brings about a coordination of the compressors of the two cylinder banks. Since this coordination adapts a characteristic variable for the rotational speed of the first compressor to the corresponding characteristic variable for the rotational speed of the second compressor, this coordination of the two compressors is able to be accomplished in an especially simple and precise manner.

It is especially advantageous if the rotational speed of the first compressor is selected as characteristic variable for the rotational speed of the first compressor, and the rotational speed of the second compressor is selected as characteristic variable for the rotational speed of the second compressor. In this manner the coordination of the two compressors is carried out by an adjustment of the rotational speeds of the two compressors. This allows an optimal synchronization of the operation of the two compressors.

Another advantage results if the rotational speed of the first compressor and the rotational speed of the second compressor are measured. This permits the rotational speeds of the first compressor and the second compressor to be ascertained more precisely than through modeling on the basis of a plurality of performance quantities of the internal combustion engine. Such modeling is relatively imprecise since it requires the individual tolerances of the sensors utilized to determine the performance quantities on which the modeling is based to be taken into account. As a result, the coordination of the compressors on the basis of the measured rotational speeds of the two compressors is able to be realized in an even more accurate manner.

Using a closed-loop control, the actual value of the characteristic variable for the rotational speed of the first compressor and the actual value of the characteristic variable for the rotational speed of the second compressor are adaptable to the shared setpoint value in an especially simple manner and with little effort.

Another advantage results if the shared setpoint value is limited to a predefined range. In this way, the compressors are able to be effectively protected against wear and destruction.

DETAILED DESCRIPTION

Figure 1:
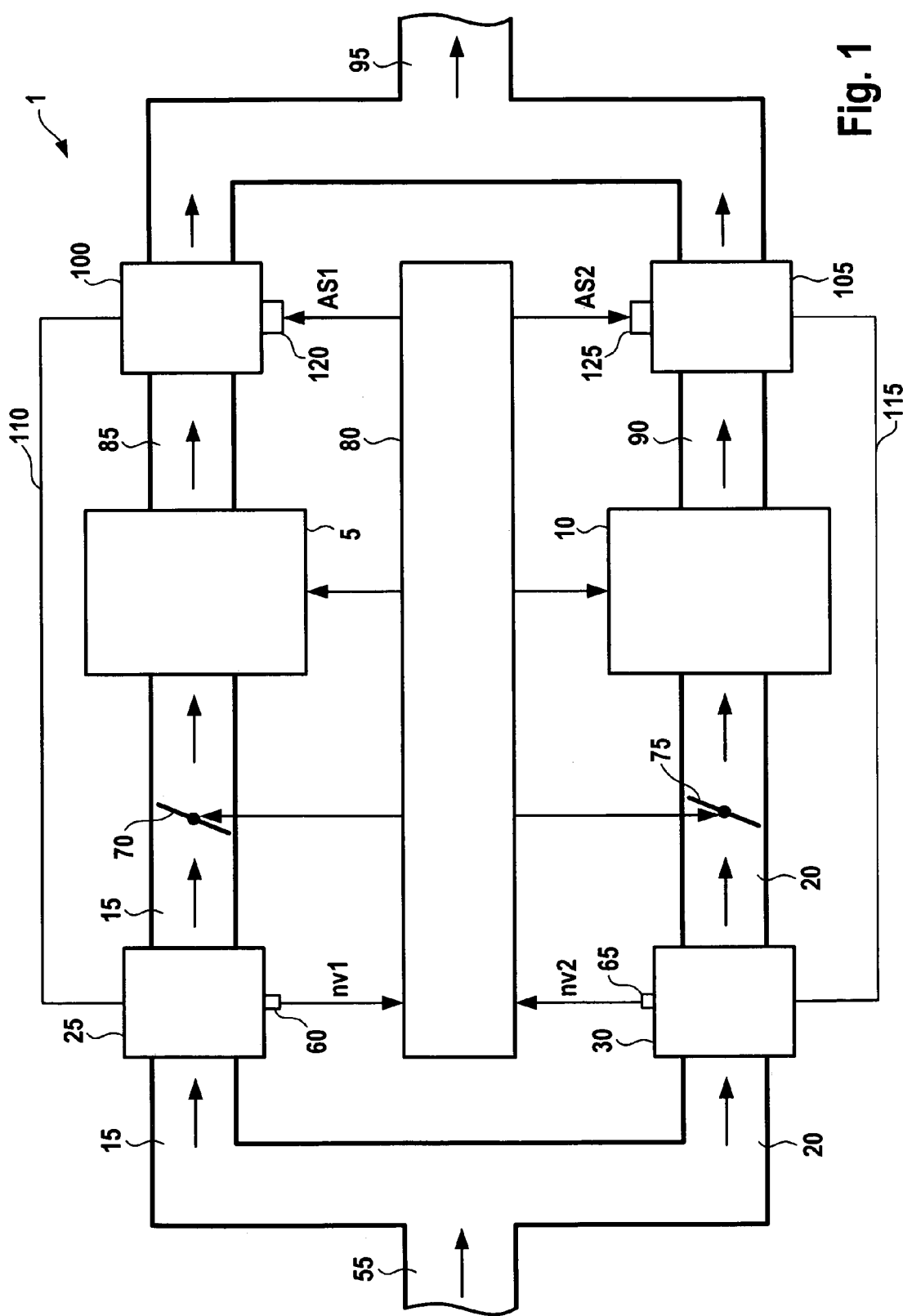
FIG. 1 shows a schematic view of an internal combustion engine having two cylinder banks.

Reference numeral 1 in FIG. 1 designates an internal combustion engine. Internal combustion engine 1 is able to drive a vehicle, for example, and may be configured as an Otto engine or a Diesel engine, for instance. In the following it is assumed by way of example that internal combustion engine 1 takes the form of an Otto engine. In the specific embodiment according to FIG. 1, Otto engine 1 includes a first cylinder bank 5 and a second cylinder bank 10. First cylinder bank 5 and second cylinder bank 10 each have at least one cylinder. Hereinafter it is to be assumed by way of example that the two cylinder banks 5, 10 each have the same number of cylinders, so that, if possible, a synchronous, coordinated operation of the two cylinder banks 5, 10 is able to be realized. Fresh air is supplied to first cylinder bank 5 via a first air supply 15. Second cylinder bank 10 is supplied with fresh air via a second air supply 20. The two air supplies 15, 20 are provided with fresh air via a shared air supply 55. The flow direction of the fresh air is indicated by arrows in air supplies 15, 20, 55 in FIG. 1. Arranged in first air supply 15 is a first compressor 25, and a second compressor 30 is arranged in second air supply 20. First compressor 25 is driven via a first shaft 110 by a first turbine 100 in a first exhaust branch 85 of first cylinder bank 5. Second compressor 30 is driven via a second shaft 115 by a second turbine 105 in a second exhaust branch 90 of second cylinder bank 10. Arranged downstream from first compressor 25, in first air supply 15, is a first throttle valve 70 by whose setting the air supply to the cylinders of first cylinder bank 5 is able to be influenced. Arranged downstream from second compressor 30, in second air supply 20, is a second throttle valve 75 by whose setting the air supply to the cylinders of second cylinder bank 10 is able to be influenced. First throttle valve 70 and second throttle valve 75 are controlled by an engine control 80. Engine control 80 may control both throttle valves 70, 75 in a manner known to one skilled in the art so as to realize a driver-desired torque, for instance. The two throttle valves 70, 75 may be controlled in synchrony by engine control 80. This means that engine control 80 controls the two throttle valves 70, 75 in such a way that they assume the same position at the same time. In FIG. 1, it is indicated by an arrow from engine control 80 to first cylinder bank 5 and by an arrow from engine control 80 to second cylinder bank 10 that engine control 80 also controls the ignition and fuel injection for the cylinders of first cylinder bank 5 and the cylinders of second cylinder bank 10 in a manner known to one skilled in the art. The exhaust gas formed in the combustion chamber of first cylinder bank 5 during the combustion of the air-fuel mixture is expelled into a first exhaust branch 85. The exhaust gas formed during the combustion of the air-fuel mixture in the combustion chamber of second cylinder bank 10 is expelled into second exhaust branch 90. The flow direction of the exhaust gas in both exhaust branches 85, 90 is also indicated by arrows in FIG. 1. Downstream from the two turbines 100, 105, the two exhaust branches 85, 90 unite to form a shared exhaust branch 95, the flow direction of the exhaust gas in shared exhaust branch 95 likewise being indicated by an arrow. First compressor 25, first shaft 110, and first turbine 100 form a first exhaust turbocharger, and second compressor 30, second shaft 115, and second turbine 105 form a second exhaust turbocharger. Hereinafter it is to be assumed by way of example that both cylinder banks 5, 10 with their two air supplies 15, 20, their two exhaust turbochargers, and their two exhaust branches 85, 90 are configured symmetrically. Arranged in the region of first compressor 25 is a first rpm sensor 60 which measures an actual value nv1 for the rotational speed of first compressor 5 and forwards this measured value to engine control 80.

Arranged in the region of second compressor 30 is a second rpm sensor 65 which measures an actual value nv2 for the rotational speed of second compressor 30 and forwards the measured value to engine control 80. First rpm sensor 60 and second rpm sensor 65 may measure actual values nv1, nv2 for the rotational speed of compressors 25, 30 in the manner known to one skilled in the art, utilizing the Hall effect or the GMR effect (GMR=giant magneto resistance). The measurement of actual values nv1, nv2 for the rotational speeds of compressors 25, 30 may be implemented in a manner known from the European Published Patent Application No. 0 952 454, for instance. The rotational-speed measurement on the basis of the GMR effect is known from German Published Patent Application No. 102 50 319, for example. Actual value nv1 for the rotational speed of first compressor 25 may also be ascertained by a corresponding measurement of the rotational speed of first turbine 100 or first shaft 110. As a rule, the rotational speed of first turbine 100 corresponds to the rotational speed of first shaft 110 and actual value nv1 for the rotational speed of first compressor 25. In this case, first rpm sensor 60 is arranged in the region of first turbine 100 or first shaft 110 so as to measure the rotational speed of first turbine 100 or first shaft 110. Analogously, actual value nv2 for the rotational speed of second compressor 30 may be ascertained by a corresponding measurement of the rotational speed of second turbine 105 or second shaft 115. As a rule, the rotational speed of second turbine 105 corresponds to the rotational speed of second shaft 115 and actual value nv2 for the rotational speed of second compressor 30. In this case, second rpm sensor 65 is arranged in the region of second turbine 105 or second shaft 115 so as to measure the rotational speed of second turbine 105 or second shaft 115.

Utilizing the GMR effect, first rpm sensor 60 or second rpm sensor 65 cooperates with a permanent magnet arranged on a shaft of corresponding compressor 25, 30. This permanent magnet is magnetized. The individual rpm sensor 60, 65 then includes a measuring element that records the rotational speed of the permanent magnet, and thus that of the shaft of corresponding compressor 25, 30, and therefore corresponding compressor 25, 30, on the basis of the GMR effect, such as described in German Published Patent Application No. 102 50 319.

However, it is also possible to use an estimated value derived from performance quantities of internal combustion engine 1 for actual values nv1, nv2 of the rotational speed of compressors 25, 30. In the case at hand, however, actual values nv1, nv2 of the rotational speed of compressors 25, 30 are provided by rpm sensors 60, 65.

The possible calculation of the estimated values for actual values nv1, nv2 of the rotational speeds of compressors 25, 30 is not discussed here in greater detail since methods known from the related art may be utilized to this end. It should only be mentioned at this point that actual values nv1, nv2 for the rotational speeds of compressors 25, 30 are derivable from variables such as the actual charge pressure in individual air supply 15, 20, an ambient pressure, and the aspirated air mass of individual air supply 15, 20. A required multitude of sensors yields a relatively imprecise signal due to the individual tolerances of the sensors. Therefore, a distinct safety margin with respect to a maximally allowed rotational speed nvmx of both compressors 25, 30 is observed in this case. As described, it should be assumed here by way of example that both compressors 25, 30 have the same dimensions and configurations, if possible, so that the same maximally allowed rotational speed nvmx is to be maintained for them. Due to the direct measuring of actual values nv1, nv2 of the rotational speeds of compressors 25, 30 with the aid of rpm sensors 60, 65, this safety margin may be smaller since only the measuring tolerance of rpm sensors 60, 65 needs to be taken into account. The required safety margin may already be included in the maximally allowed rotational speed nvmx of compressors 25, 30, or it may be considered when applying maximally allowed rotational speed nvmx on a test stand.

A first actuating element 120 is arranged in the region of first turbine 100. A second actuating element 125 is arranged in the region of second turbine 105. First actuating element 120 influences the turbine geometry of first turbine 100, for instance. As an alternative, first actuating element 120 may also represent a bypass valve in a bypass circumventing first turbine 100 in exhaust branch 85. Second actuating element 125 makes it possible to influence the geometry of second turbine 105, for instance. As an alternative, second actuating element 125 may constitute a bypass valve in a bypass circumventing second turbine 105 in second exhaust branch 90. In general, first actuating element 120 is used to bring the charge pressure in first air supply 15, which is to be set by first compressor 25, to a predefined setpoint value. To this end, first actuating element 120 could also form, for instance, a bypass in a bypass circumventing first compressor 25 in first air supply 15. Analogously, second actuating element 125 is used to adjust a predefined setpoint value for the charge pressure in second air supply 20, which is to be set by second compressor 30. To this end, second actuating element 125 could also be configured as, for instance, bypass valve in a bypass circumventing second compressor 30 in second air supply 20. The setpoint values for the charge pressure to be set by first compressor 25 and second compressor 30 are ascertained in engine control 80 in a manner known to one skilled in the art. For synchronous operation, if possible, of the two cylinder banks 5, 10, the example at hand provides that both compressors 25, 30 are to realize approximately the same setpoint value for the charge pressure in first air supply 15 and in second air supply 20, respectively. Due to the described symmetry of the configuration of internal combustion engine 1, in particular, this may be achieved by setting a shared setpoint value for the rotational speeds of both compressors 25, 30. To this end, engine control 80 generates a first control signal AS1 to trigger first actuating element 120, and a second control signal AS2 to trigger second actuating element 125.

According to the present invention, a shared setpoint value is specified for a characteristic variable for the rotational speed of first compressor 25 in first air supply 15 of first cylinder bank 5 and for a characteristic variable for the rotational speed of second compressor 30 in second air supply 20 of second cylinder bank 10, and an actual value of the characteristic variable for the rotational speed of first compressor 25 and an actual value of the characteristic variable for the rotational speed of second compressor 30 are corrected to the shared setpoint value. In the example described here, the rotational speed of first compressor 25 is selected as characteristic variable for the rotational speed of first compressor 25, and the rotational speed of second compressor 30 is selected as characteristic variable for the rotational speed of second compressor 30. However, as already described earlier, it is also possible, as an alternative, to select the rotational speed of first shaft 110 or the rotational speed of first turbine 100 as characteristic variable for the rotational speed of first compressor 25. Alternatively, the rotational speed of second shaft 115 or the rotational speed of second turbine 105 may also be selected as characteristic variable for the rotational speed of second compressor 30. The correction of the actual value of characteristic variable for the rotational speed of first compressor 25—here, actual value nv1 of the rotational speed of first compressor 25—, and of the actual value of the characteristic variable for the rotational speed of second compressor 30—here, actual value nv2 for the rotational speed of second compressor 30—, to the shared setpoint value may be accomplished by an individual closed-loop control, for example, as will be explained in greater detail with the aid of the flow chart of FIG. 2. The shared setpoint value for the characteristic variable for the rotational speed of both compressors 25, 30—here, the shared setpoint value for the rotational speed of the two compressors 25, 30—may also be restricted to a predefined range.

Figure 2:
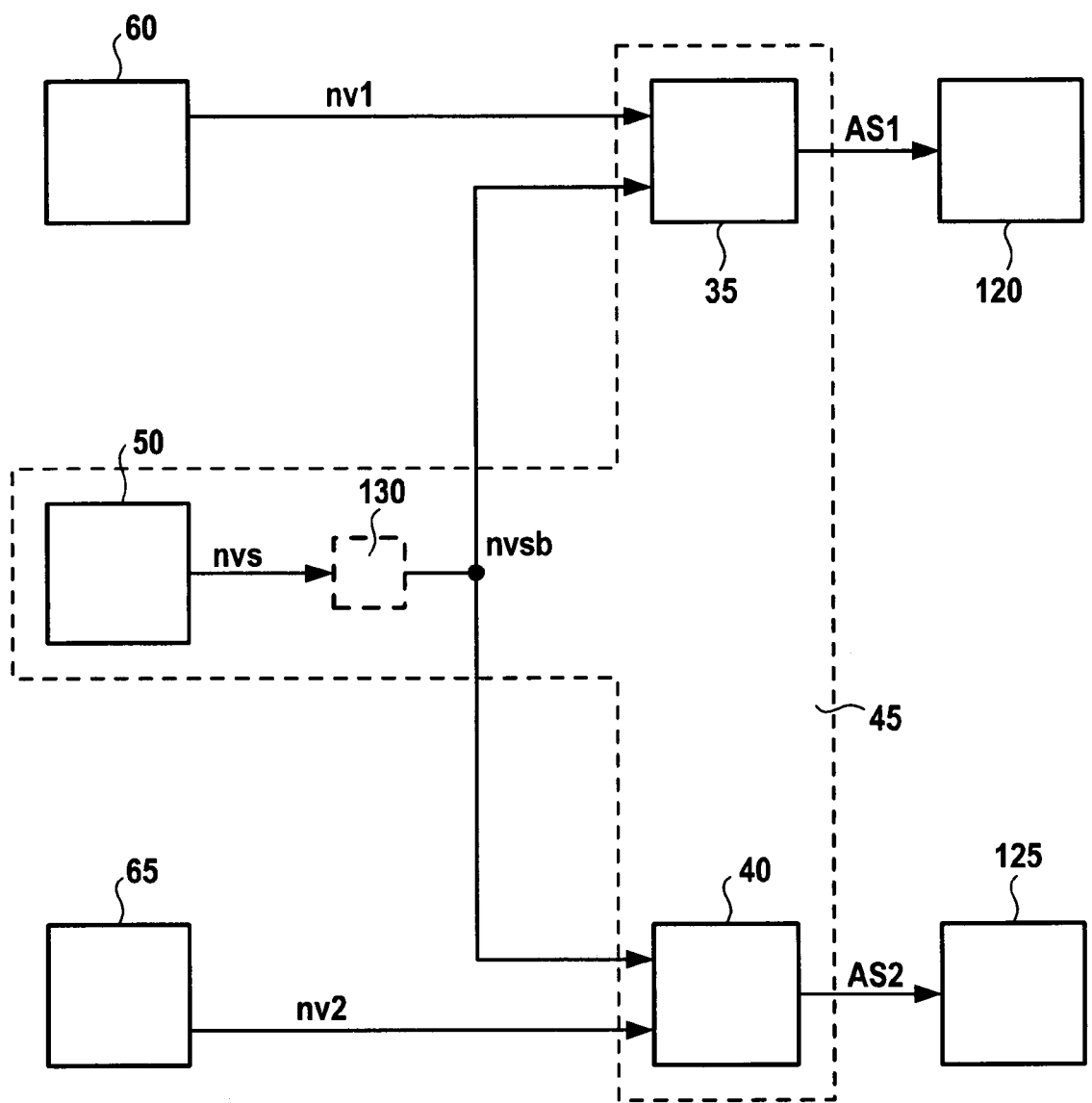
FIG. 2 shows a flow chart to explain the method according to the present invention and the device according to the present invention.

In FIG. 2, identical reference numerals designate the same elements as in FIG. 1. FIG. 2 illustrates a device 45 according to the present invention in the form of a flow chart which may be implemented in engine control 80 in the form of software and/or hardware. The method of the present invention is able to be illustrated on the basis of this flow chart 45.

Flow chart 45 includes an input unit 50 which inputs a shared setpoint value nvs for the rotational speed of the two compressors 25, 30 in order to achieve synchronism of the two compressors 25, 30. As an option and as indicated by dashed lines in FIG. 2, a limiting unit 130 to which setpoint value nvs for the rotational speed of the two compressors 25, 30 is supplied on the input side may be present in flow chart 45. Limiting unit 130 compares setpoint value nvs for the rotational speed of the two compressors 25, 30 with the maximally allowed rotational speed nvmx of the two compressors 25, 30. Limiting unit 130 forms the minimum from setpoint value nvs for the rotational speed of the two compressors 25, 30 and the maximally allowed rotational speed nvmx of the two compressors 25, 30, outputting this minimum to a first controller 35 and to a second controller 40 as restricted setpoint value nvsb for the rotational speed of the two compressors 25, 30. Limiting unit 130 is thus configured as minimum-selection member. Without the use of limiting unit 130, setpoint value nvs for the rotational speed of the two compressors 25, 30 is output to both controllers 35, 40 in unrestricted form. Maximally allowed rotational speed nvmx of both compressors 25, 30 may be applied on a test stand, for instance, in such a way that excessive loading of the components of the two exhaust turbochargers of internal combustion engine 1 and especially of the two compressors 25, 30, by the rotational speed of the two compressors 25, 30 is avoided, in particular that a destruction is reliably prevented. In this example, limiting unit 130 restricts setpoint value nvs for the rotational speed of the two compressors 25, 30 to a range unilaterally defined by maximally allowable rotational speed nvmx of the two compressors 25, 30.

In addition to possibly restricted setpoint value nvsb for the rotational speed of the two compressors 25, 30, first rpm sensor 60 provides first controller 35 in flow chart 45 with actual value nv1 for the rotational speed of first compressor 25 as input variable. First controller 35 forms the difference between actual value nv1 for the rotational speed of first compressor 25 and possibly restricted setpoint value nvsb for the rotational speed of the two compressors 25, 30. First controller 35 generates first control signal AS1 for first actuating element 120 as a function of this difference, in such a way that the amount of this difference nv1−nvsb becomes as small as possible. Analogously, in addition to possibly restricted setpoint value nvsb for the rotational speed of the two compressors 25, 30, second controller 40 is provided with actual value nv2 for the rotational speed of second compressor 30 as input variable. Second controller 40 forms the difference between actual value nv2 for the rotational speed of second compressor 30 and possibly restricted setpoint value nvsb for the rotational speed of the two compressors 25, 30. Second controller 40 generates second control signal AS2 for second actuating element 125 as a function of this difference, in such a way that the amount of difference nv2−nvsb also becomes as small as possible.

The present invention is described here by way of example in case that internal combustion engine 1 has two cylinder banks 5, 10. However, in an analogous manner, the method of the present invention and the device of the present invention are also applicable to internal combustion engines having more than two cylinder banks, each of which is assigned a compressor in an individually assigned air supply, and in which a characteristic variable for the rotational speed of the compressors is to be corrected to a shared setpoint value. The flow chart in FIG. 2 is to be supplemented in such a way that a separate controller is assigned for each cylinder bank having such a compressor to be coordinated, this controller being supplied not only with the actual value for the characteristic variable for the rotational speed of this compressor but also with the possibly restricted shared setpoint value for this characteristic variable, and the controller generating a control signal for an actuating element as a function of the difference between these two supplied variables, in such a way that the amount of the difference of the two mentioned input variables of the controller assigned to the individual compressor becomes minimal. In the process, this actuating element may once again influence the geometry of an associated turbine in the exhaust branch, an opening cross-section in a bypass around this turbine or in a bypass around the compressor itself.

It is irrelevant for the present invention in which manner the individual compressors of the cylinder banks are driven. In the case at hand, it was described that each compressor is driven by a turbine in the exhaust branch of the associated cylinder bank. However, compressors driven by a crankshaft of internal combustion engine 1 or also electrically driven compressors may be used as compressors. It may be provided that all compressors of internal combustion engine 1 are based on the same drive concept or that at least two compressors of internal combustion engine 1 are driven in a different manner. In electrically driven compressors the actuating element for the adjustment of the desired compressor speed may also adjust the current supply of the electromotor driving the compressor in a corresponding manner.

What is claimed is:

1. A method for operating an internal combustion engine having at least two cylinder banks, a first one of the at least two cylinder banks having a first air supply with a first compressor, and a second one of the at least two cylinder banks having a second air supply with a second air compressor, the method comprising:
   specifying a shared setpoint value for a characteristic variable for a rotational speed of the first compressor in the first air supply and for a characteristic variable for a rotational speed of the second compressor in the second air supply; and
   correcting to the shared setpoint value an actual value of the characteristic variable for the rotational speed of the first compressor and an actual value of the characteristic variable for the rotational speed of the second compressor.

2. The method as recited in claim 1, further comprising:
   selecting the rotational speed of the first compressor as the characteristic variable for the rotational speed of the first compressor; and
   selecting the rotational speed of the second compressor as the characteristic variable for the rotational speed of the second compressor.

3. The method as recited in claim 1, further comprising:
   measuring the rotational speed of the first compressor and the rotational speed of the second compressor.

4. The method as recited in claim 1, wherein:
   the correcting step is performed with the aid of a closed-loop control in each case.

5. The method as recited in claim 1, further comprising:
   restricting the shared setpoint value to a predefined range.

6. A device for operating an internal combustion engine having at least two cylinder banks, a first one of the at least two cylinder banks having a first air supply with a first compressor, and a second one of the at least two cylinder banks having a second air supply with a second air compressor, comprising:
   an input arrangement for predefining a shared setpoint value for a characteristic variable for a rotational speed of the first compressor in the first air supply and for a characteristic variable for a rotational speed of the second compressor in the second air supply; and
   a correction arrangement for adapting to the shared setpoint value an actual value of the characteristic variable for the rotational speed of the first compressor and an actual value of the characteristic variable for the rotational speed of the second compressor.

* * * * *